US010984007B2

(12) United States Patent
Yao et al.

(10) Patent No.: US 10,984,007 B2
(45) Date of Patent: Apr. 20, 2021

(54) RECOMMENDATION RANKING ALGORITHMS THAT OPTIMIZE BEYOND BOOKING

(71) Applicant: Airbnb, Inc., San Francisco, CA (US)

(72) Inventors: Shijing Yao, El Cerrito, CA (US); Yizheng Liao, Millbrae, CA (US)

(73) Assignee: Airbnb, Inc., San Francisco, CA (US)

( * ) Notice: Subject to any disclaimer, the term of this patent is extended or adjusted under 35 U.S.C. 154(b) by 290 days.

(21) Appl. No.: 16/124,095

(22) Filed: Sep. 6, 2018

(65) Prior Publication Data

US 2020/0081988 A1 Mar. 12, 2020

(51) Int. Cl.
*G06F 16/2457* (2019.01)
*G06F 16/9038* (2019.01)
*G06F 16/951* (2019.01)
*G06F 17/18* (2006.01)
*G06Q 10/02* (2012.01)
(Continued)

(52) U.S. Cl.
CPC .... *G06F 16/24578* (2019.01); *G06F 16/9038* (2019.01); *G06F 16/951* (2019.01); *G06F 17/18* (2013.01); *G06Q 10/02* (2013.01); *G06Q 10/04* (2013.01)

(58) Field of Classification Search
CPC ........... G06F 16/24578; G06F 16/9038; G06F 16/951; G06F 17/18; G06F 17/11; G06Q 10/02; G06Q 10/04; G06Q 30/0223; G06Q 30/0283; G06Q 30/0643; G06Q 30/0201; G06Q 30/0206; G06Q 30/02; G06Q 30/0631
See application file for complete search history.

(56) References Cited

U.S. PATENT DOCUMENTS

| 8,756,178 | B1 * | 6/2014 | Bruckhaus | G06N 7/02 706/13 |
| 9,159,041 | B1 * | 10/2015 | Liu | G06Q 10/063116 |
| 10,198,762 | B1 * | 2/2019 | Dangaltchev | G06F 16/248 |

(Continued)

FOREIGN PATENT DOCUMENTS

| EP | 3133536 A1 * | 2/2017 | ............. G01C 21/20 |
| WO | WO-2015/108960 A1 | 7/2015 | |

OTHER PUBLICATIONS

Orosa et al. "Scalable Multi-Objective Optimization"; http://www.giaa.inf.uc3m.es/miembros/lmarti; 2011 (Year: 2011).*

(Continued)

*Primary Examiner* — Dennis Truong
(74) *Attorney, Agent, or Firm* — Fenwick & West LLP (57) ABSTRACT

A computer implemented method for incorporating multiple objectives in a ranked list of search results includes receiving a search query from a client device, accessing a set of stored listings for goods or services and probabilities of serving the listings, defining a serving vector as a probability distribution over the set of listings, providing a serving vector as input to a multi-objective function, decomposing the multi-objective function into one or more objective functions, generating a ranked list of the listings based at least in part on the serving vector that maximizes the decomposed multi-objective function, and providing the listings to the client device according to the order of the ranked list. Each objective function addresses a different goal in an overall diversity optimization.

17 Claims, 5 Drawing Sheets

(51) Int. Cl.
*G06Q 10/04* (2012.01)
*G06Q 50/14* (2012.01)

(56) References Cited

U.S. PATENT DOCUMENTS

| | | | | |
|---|---|---|---|---|
| 10,678,591 B1* | 6/2020 | Cory | .................. | G06N 5/02 |
| 2005/0143845 A1* | 6/2005 | Kaji | .................. | G05B 13/0265 |
| | | | | 700/28 |
| 2005/0187846 A1* | 8/2005 | Subbu | .................. | G06Q 40/06 |
| | | | | 705/36 R |
| 2007/0067225 A1* | 3/2007 | Fabris | .................. | G06Q 30/0613 |
| | | | | 705/26.41 |
| 2007/0094056 A1* | 4/2007 | Kang | .................. | G06Q 50/14 |
| | | | | 705/5 |
| 2008/0091478 A1* | 4/2008 | Messa | .................. | G06Q 10/04 |
| | | | | 705/5 |
| 2008/0147450 A1* | 6/2008 | Mortimore | .................. | G06Q 10/02 |
| | | | | 705/5 |
| 2009/0234710 A1* | 9/2009 | Belgaied Hassine | .................. | |
| | | | | G06Q 30/0206 |
| | | | | 705/7.29 |
| 2011/0004509 A1* | 1/2011 | Wu | .................. | G06Q 10/06375 |
| | | | | 705/7.37 |
| 2011/0145061 A1* | 6/2011 | Spurr | .................. | G06Q 30/0251 |
| | | | | 705/14.49 |
| 2011/0202410 A1* | 8/2011 | Ginsburg | .................. | G06Q 10/0875 |
| | | | | 705/14.69 |
| 2012/0011112 A1* | 1/2012 | Bian | .................. | G06F 16/951 |
| | | | | 707/723 |
| 2013/0046769 A1* | 2/2013 | He | .................. | G06F 16/334 |
| | | | | 707/748 |
| 2014/0164170 A1* | 6/2014 | Li | .................. | G06Q 30/0631 |
| | | | | 705/26.7 |
| 2014/0180809 A1* | 6/2014 | Boal | .................. | G06Q 30/0251 |
| | | | | 705/14.53 |
| 2014/0278671 A1* | 9/2014 | Leonhardt | .................. | G06Q 10/1095 |
| | | | | 705/7.19 |
| 2015/0199621 A1* | 7/2015 | Kelly | .................. | G06F 16/24578 |
| | | | | 705/5 |
| 2015/0206258 A1* | 7/2015 | Charkov | .................. | G06Q 30/0629 |
| | | | | 705/26.64 |
| 2015/0227848 A1* | 8/2015 | Amid | .................. | G06N 7/005 |
| | | | | 706/13 |
| 2015/0379075 A1* | 12/2015 | Hara | .................. | G06N 3/126 |
| | | | | 707/713 |
| 2016/0078374 A1* | 3/2016 | Lippow | .................. | G06Q 30/0643 |
| | | | | 705/5 |
| 2016/0098649 A1* | 4/2016 | Ifrach | .................. | G06Q 10/02 |
| | | | | 705/5 |
| 2017/0031904 A1* | 2/2017 | Legrand | .................. | G06F 16/34 |
| 2017/0053209 A1* | 2/2017 | Ceret | .................. | G01C 21/343 |
| 2017/0169353 A1* | 6/2017 | Thompson | .................. | G06N 3/086 |
| 2017/0178036 A1* | 6/2017 | Xu | .................. | G06F 17/18 |
| 2018/0082209 A1* | 3/2018 | Thompson | .................. | G06N 3/126 |
| 2018/0341695 A1* | 11/2018 | Goeser | .................. | G06F 16/285 |
| 2019/0080009 A1* | 3/2019 | Basu | .................. | G06F 16/24578 |
| 2019/0244686 A1* | 8/2019 | Shahrzad | .................. | G16H 50/20 |
| 2019/0266215 A1* | 8/2019 | Kantor | .................. | G06N 5/045 |
| 2019/0311301 A1* | 10/2019 | Pyati | .................. | G06F 16/901 |

OTHER PUBLICATIONS

Chircop et al. "On ϵ-constraint based methods for the generation of Pareto frontiers"; University of Malta; Jan. 25, 2012. (Year: 2012).*

Adomavicius et al. "Maximizing Aggregate Recommendation Diversity: A Graph-Theoretic Approach"; Workshop on Novelty and Diversity in . . . ,2011—Citeseer http://citeseerx.ist.psu.edu/viewdoc/download?doi=10.1.1.232.2775&rep=rep1&type=pdf#page=13 (Year: 2011).*

R. Giusti and G. E. A. P. A. Batista, "Discovering Knowledge Rules with Multi-Objective Evolutionary Computing," 2010 Ninth International Conference on Machine Learning and Applications, Washington, DC, USA, 2010, pp. 119-124, doi: 10.1109/ICMLA.2010. 25. (Year: 2010).*

M. R. Koochi, A. R. C. Hussin and H. M. Dahlan, "Improving recommendation diversity using tensor decomposition and clustering approaches," 2014 4th World Congress on Information and Communication Technologies (WICT 2014), Melaka, Malaysia, 2014, pp. 240-245, doi: 10.1109/WICT.2014.7076912. (Year: 2014).*

PCT International Search Report and Written Opinion, PCT Application No. PCT/US2019/039628, dated Sep. 27, 2019, 13 pages.

* cited by examiner

RECOMMENDATION RANKING ALGORITHMS THAT OPTIMIZE BEYOND BOOKING

BACKGROUND

Online computer systems have begun to offer experiences for reservation. Experiences are real-world excursions or other activities designed and led by hosts which have a limited number of seats (slots) available for guests to book. Existing online computer systems that provide experiences rank listings according to a single objective. Typically, the single objective is to maximize the total expected number of bookings. While the exact ranking mechanism varies, these systems fail to consider business needs (e.g., inventory balancing) and social goals (e.g., diversity, community inclusiveness, family-friendliness, etc.).

This can result in inventory balancing problems. For example, a host typically wants to avoid a situation where only a small percentage of seats in the experience are booked. A small percentage may be any percentage that fails to recoup the host's expenses for carrying out the experience, or any other minimum threshold level of booking that the host would consider as not being worthwhile to carry out the experience. In these situations, the host is likely to earn minimally and suffer a large opportunity cost.

Diversity in search results is another problem related to ranking experiences for booking. For example, multiple experiences of the same category are displayed consecutively, which provides little diversity to a user of the online computer system who is looking for experiences to book.

Thus, an improved online computer system for ranking experiences is desired.

SUMMARY

Embodiments relate to a computer implemented method for incorporating multiple objectives in a ranked list of search results, provided for display as part of a graphical user interface on a display screen of a computing device. The method includes receiving a search query from a client device, accessing a set of stored listings for goods or services and probabilities associated with serving the listings, defining a serving vector as a probability distribution over the set of listings, providing the serving vector as input to a multi-objective function, decomposing the multi-objective function into one or more objective functions, generating a ranked list of the listings based at least in part on the decomposed multi-objective function, and providing the listings to the client device according to the order of the ranked list. The serving vector is a probability distribution over a set of the accessed listings that are going to be presented to the client device and maximizes the multi-objective function. Each objective function addresses a different goal in an overall optimization

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION

System Overview

Figure 1:
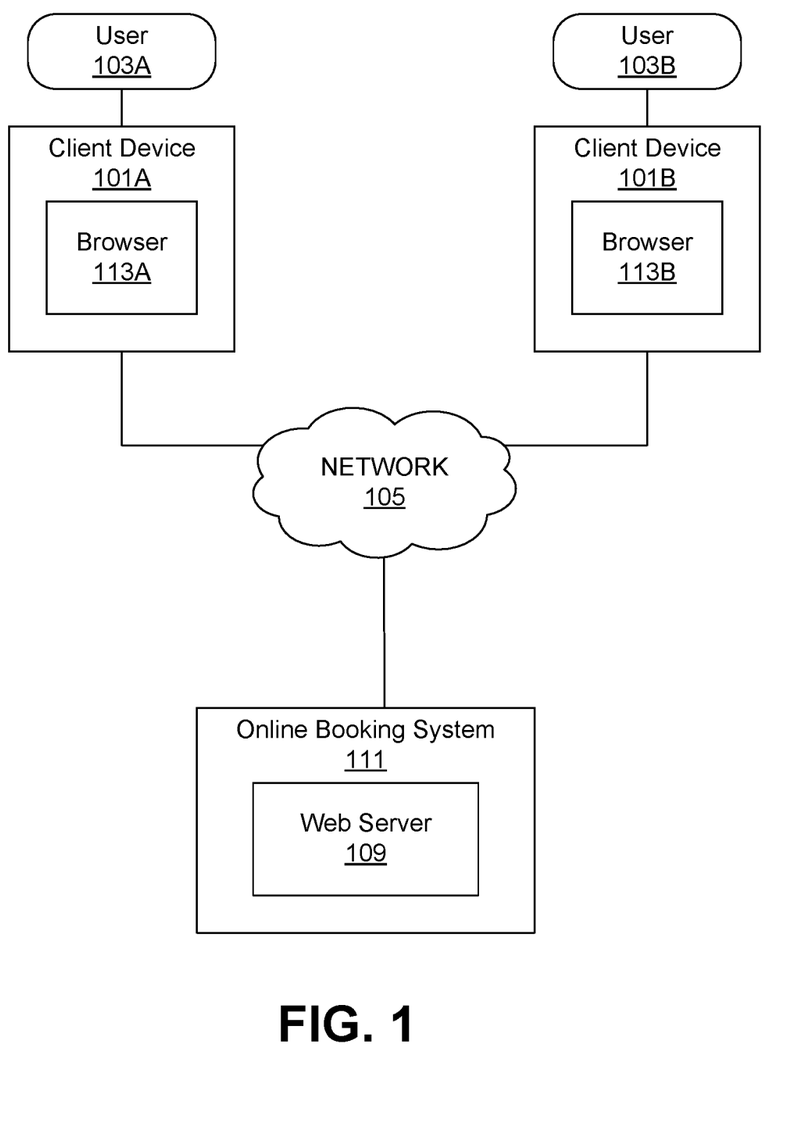
FIG. 1 is a block diagram of a computing environment for an online booking system that ranks listings of goods or services using a recommendation ranking algorithm that optimizes beyond booking, according to one embodiment.

FIG. 1 is a block diagram of a computing environment for an online booking system that ranks listings of goods or services using a recommendation ranking algorithm that optimizes beyond booking, according to one embodiment. FIG. 1 and the other figures use like reference numerals to identify like elements. A letter after a reference numeral, such as "113A," indicates that the text refers specifically to the element having that particular reference numeral. A reference numeral in the text without a following letter, such as "113," refers to any or all of the elements in the figures bearing that reference numeral (e.g. "113" in the text refers to reference numerals "113A" and/or "113B" in the figures).

The network 105 represents the communication pathways between users 103 (e.g., consumers) and the online booking system 111. In one embodiment, the network is the Internet. The network can also utilize dedicated or private communication links (e.g. WAN, MAN, or LAN) that are not necessarily part of the Internet. The network uses standard communications technologies and/or protocols.

The client devices 101 are used by the users 103 for interacting with the online booking system 111. A client device 101 can be any device that is or incorporates a computer such as a personal computer (PC), a desktop computer, a laptop computer, a notebook, a smartphone, or the like. A computer is a device having one or more general or special purpose processors, memory, storage, and networking components (either wired or wireless). The device executes an operating system, for example, a Microsoft Windows-compatible operating system (OS), Apple OS X or iOS, a Linux distribution, or Google's Android OS. In some embodiments, the client device 101 may use a web browser 113, such as Microsoft Internet Explorer, Mozilla Firefox, Google Chrome, or Apple Safari and/or Opera, as an interface to interact with the online booking system 111. In other embodiment, the client device 101 can execute a dedicated application for accessing the online booking system 111.

The online booking system 111 includes web server 109 that presents web pages or other web content, which form the basic interface to the users 103. Users 103 use respective client devices 101 to access one or more web pages, and provide data to the online booking system 111.

The online booking system 111 may be, for example, an accommodation reservation system, a dining reservation system, a rideshare reservation system, a retail system, an experience reservation system, and the like. More generally, the online booking system 111 provides users with access to an inventory of resources (e.g. goods and services) that are available to consumers, and for which the real world, physical location of the resource is considered as an intangible factor in the consumer's decision to consume (e.g., purchase, rent, or otherwise obtain) the resource. Generally, resources available at some locations are more desirable than otherwise identical resources available at other locations. Resources include accommodations; restaurants; vehicles; attractions (e.g., shows, events, tourists attractions); shopping centers; and the like. For example, in an online booking system 111 that provides accommodations, accommodations in particular neighborhoods may be more or less desirable than otherwise identical accommodations in some other neighborhood: a given neighborhood may be considered more interesting, more prestigious, safer, or have some other quality that consumers deem valuable when selecting accommodations. Resources also include experiences. Experiences are real-world excursions or other activities designed and led by hosts which have a limited number of seats (slots) available for guests to book. Experience categories include nature, food and drink, surfing, classes and workshops, and the like. For example, in an online booking system 111 that provides experiences, a set of listings are provided for display on a client device in a ranked order. In addition to the expected number of bookings, the ranking may be based on one or more objectives related to business needs or social needs. For example, a given listing with a low occupancy rate may be ranked higher than a listing with a high occupancy rate. Additionally or optionally, the set of listings may be post-processed based on a diversity metric between the listings, such as the experience category of each listed experience.

In some embodiments, the online booking system 111 facilitates transactions between users 103. For example, an accommodation reservation system allows users 103 to book accommodations provided by other users of the accommodation reservation system. A rideshare reservation system allows users 103 to book rides from one location to another. An online market place system allows users 103 to buy and/or sell goods or services face to face with other users. The online booking system 111 comprises additional components and modules that are described below.

Online Booking System Overview

Figure 2:
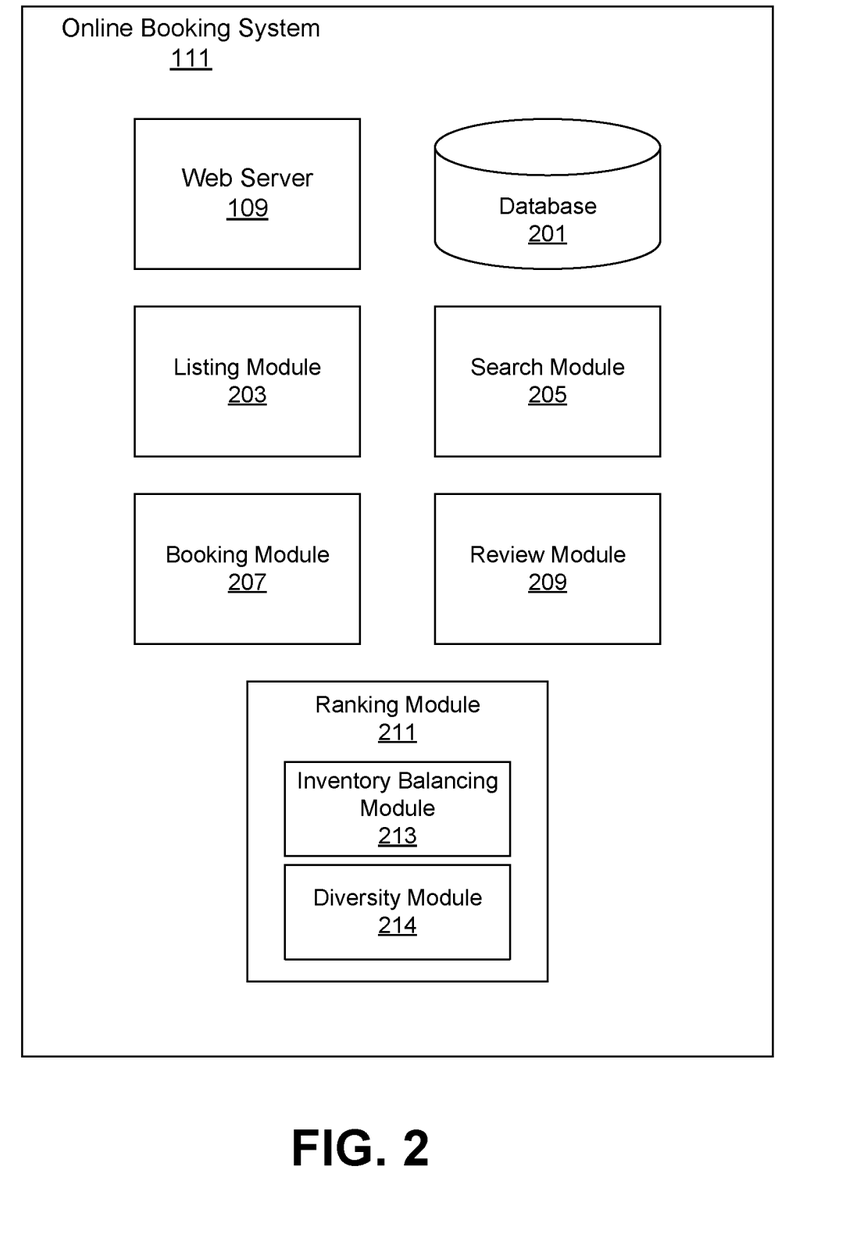
FIG. 2 is a block diagram of an online booking system that ranks listings of goods or services using a recommendation ranking algorithm that optimizes beyond booking, according to one embodiment.

FIG. 2 is a block diagram of an online booking system that ranks listings of goods or services using a recommendation ranking algorithm that optimizes beyond booking, according to one embodiment. The online booking system 111 includes a database 201, a listing module 203, a search module 205, a booking module 207, a review module 209, and a ranking module 211.

Those of skill in the art will appreciate that the online booking system 111 will contain other modules appropriate for its functionality (e.g., social networking, banking, commerce, etc.), but that are not described herein, since they are not directly material to the invention. In addition, conventional elements, such as firewalls, authentication and encryption systems, network management tools, load balancers, and so forth are not shown as they are not material to the invention. The online booking system 111 may be implemented using a single computer, or a network of computers, including cloud-based computer implementations. The computers are preferably server class computers including one or more high-performance computer processors and main memory, and running an operating system such as LINUX or variants thereof. The operations of the system 111 as described herein can be controlled through either hardware or through computer programs installed in non-transitory computer storage and executed by the processors to perform the functions described herein. The database 201 is implemented using non-transitory computer readable storage devices, and suitable database management systems for data access and retrieval. The database 201 is implemented in a database management system, such as a relational database (e.g., MySQL). The online booking system 111 includes other hardware elements necessary for the operations described here, including network interfaces and protocols, input devices for data entry, and output devices for display, printing, or other presentations of data. As will become apparent below, the operations and functions of the online booking system 111 are sufficiently complex as to require their implementation on a computer system, and cannot be performed as a practical matter in the human mind.

The listing module 203 provides a user interface and processing logic for users to list goods or services for purchase or rent to other users, and is one means for doing so. For example, if the online booking system 111 is an accommodation reservation system, then the listing module 203 provides a user interface suitable for listing accommodations, such as houses, apartments, condominiums, rooms, treehouses, castles, tents, couches, and sleeping spaces. If the online booking system 111 is a dining reservation system, then the listing module 203 provides a user interface for listing available reservations at restaurants, entertainment venues, resorts, etc. If the online booking system 111 is a rideshare reservation system, then the listing module 203 provides a user interface for listing available rides. If the online booking system 111 is an experience reservation system, then the listing module 203 provides a user interface for listing available experiences, such as nature, food and drink, surfing, classes and workshops, sports, history, history, arts, entertainment, nightlife, health and wellness, live music, social impact, music, etc.

The listing module 203 is configured to receive a listing from a user describing the good or service being offered, a time frame of its availability, a price, a location, and other relevant factors. For example, for an accommodation reservation system, a listing includes a type of accommodation (e.g. house, apartment, room, sleeping space, other), a representation of its size (e.g., square footage, or number of rooms), the dates that the good or service is available, and a rental rate (e.g., per night, week, month, etc.). For an experience reservation system, a listing includes a category of experience, a location, a duration, the dates that the experience is available, and a rate (e.g., per person). The listing module 203 allows the user to include additional information about the good or service including photographs and other media. The location information for a listing provides specific reference to a physical location or area in the real world, and may include a country, state, city, and neighborhood of the listing, geographical coordinates, mailing addresses, or other suitable location specifying information. The listing module 203 is also capable of converting one type of location information (e.g., mailing address) into another type of location information (e.g., country, state, city, and neighborhood) using externally available geographical map information. Listings created using the listing user interface are processed by the online booking system 111 and stored in the database 201.

In some online booking systems 111, some listings are temporary, are available for booking one time only, and/or are capable of being deleted by the listing user. The listing module 203 stores these historical, unavailable listings in database 201. The online booking system 111 uses these historical listings to analyze the behaviors of users in creating, searching, ranking, and booking listings. Historical listings may be encrypted or otherwise protected so that they are not available to anyone other than the operator of the listing system.

The booking module 207 provides a user interface and processing logic for users to view and book listings created by other users. The booking module 207 receives payment information from booking users, and securely transmits the payments to listing users. Any user information transmitted as part of the purchase processed is encrypted for user privacy and protection. Upon completion of a booking, the booking is encrypted and stored as historical booking information in database 201.

The review module 209 provides a user interface and processing logic to receive reviews of the listings offered by other users, providing evaluations, feedback, and other commentary about a listing, and is one means for doing so. Completed reviews may be included within and appear alongside listings, so that future users interested in booking the listing can evaluate the listing with the reviews in mind. Reviews are stored alongside their associated listings in the database 201. Similarly to historical listings, reviews for historical listings may continue be stored in database 201 after the listing is no longer available.

The search module 205 provides a user interface and processing logic for searching the database for listings responsive to a search query, and is one means for doing so. The user interface of the search module 205 is configured to receive a search query specifying various attributes of a desired good or service, such as type, location, price, and so forth. The search module matches the attributes of the search query to listings in the database 201, ranks the listings using the ranking module 211, and provides the ranked set of listings to a client device, so that the user of the client device can access the listings in a convenient manner. The user interface of the search module 205 is capable of displaying the ranked set of listings by rank order. For example, the ranked order is based on a probability of serving the listing.

Depending upon the implementation, the user interface for receiving a search query may be simple, allowing for as little as a single text string to be entered as the search query, or it may allow for multiple different kinds of predetermined and/or dynamic input options to be entered in the search query. The user interface provides for specification of a location for inclusion in the search query. The location may be auto-populated with the current location of the client device 101A the user is using to perform the search. Alternatively, the user may manually enter a location in the search query. The may include specification of a country, state (or another regional equivalent such as a province, region, territory, canton, department, county, district, or prefecture), city, neighborhood, or other designation such as geographical coordinates (e.g., longitude, latitude), a street address, and a zip codes.

The ranking module 211 provides processing logic to rank listings that match at least part of the search query, and is one means for doing so. The ranking module 211 receives a set of listings responsive to the search query from the search module 205, ranks the listings, and provides a ranked set of listings back to the search module 205 for display. The ranking module 211 ranks the received listings according to a score. The score may be based on a number of different factors that may vary between different implementations of the online booking system 111. For example, the factors used in an accommodation reservation system may vary from the factors used in a rideshare system, for example. The particular scoring function used is dependent on the nature of the overall system 111 and will thus vary. A suitable scoring function is any scoring function that can be constructed from a combination of the component factors (e.g., a linear combination), and further each component factor can be individually normalized and/or standardized. The component factors may include specific business needs such as inventory balancing and social objectives (e.g., diversity, community inclusiveness, family-friendliness, etc.). The determination of inventory balancing is performed by an inventory balancing module 213, which is further described below in detail with reference to FIG. 3. The determination of social objectives is performed by a diversity module 214, which is further described below in detail with reference to FIGS. 4A-4B. Other possible factors include, for example, the price of a listing, the number and quality of reviews of the listing provided by other users, the quality of pictures in the list, the number of successful and unsuccessful prior bookings, a reply rate, searching user behavioral signals (like clickthrough from search to listing view or listing view to booking), whether the listing is associated to the searcher via a social networking system social graph, etc.

The ranking module 211 uses the stored historical search, booking, and listing information in order to rank listings. To facilitate this, the search module 205 and booking modules 207 store search, listing browsing, and booking information in database 201. This historical information is stored on a per user, per web browsing session basis, such that a user's interactions with the online booking system 111 are stored together, including any search queries entered, any listings viewed, and any bookings made. Storing search queries and subsequent bookings together, particularly allows the online booking system 111 to aggregate useful statistics across many different users. For example based on stored historical bookings and historical search queries, the online booking system 111 is capable of determining for a given search query (or portion thereof), what bookings were made by users who entered that search query. The online booking system can also determine the reverse: for a given booking, what search queries were made by users.

In using historical search, booking, and listing information to rank listings, the ranking module 211 may use any historical period. For example, the ranking module 211 may use listings, bookings, and searches that occurred in the last month, last three months, last 6 months, last year, all time, or any period there between. Alternatively, the ranking module 211 may use listings, bookings, and searches from particular periods (e.g., that occurred during a particular season such as winter, or that occurred over Thanksgiving weekend, etc.).

In situations in which the systems discussed here collect personal information about users, or may make use of personal information, the users may be provided with an opportunity to control whether programs or features collect or store user information (e.g., whether to maintain historical listings, historical search queries, and historical bookings), or to control whether and/or how to receive content from the online booking system 111 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as an address, city, or neighborhood), so that a particular location of a user cannot be determined. The system 111 may also provide the user with the ability to control whether or not such personal information is stored, how long it is stored, how it is used, and upon request, that the information be deleted. Thus, the user may have control over how information is collected about the user and used by the online booking system 111.

Ranking

The ranking module 211 determines an order of a serving vector X to maximize a multi-objective function R(X). In some embodiments, the serving vector $X=[x_1, x_2, \ldots, x_n]$ is a vector of serving probabilities associated with listings, where n is the total number of listings for the user. $x_i$ is the probability of serving listing i to the user and $\Sigma_{i=1}^{n} x_i = 1$. The ranking output by the ranking module 211 is achieved by sorting the serving vector X by probability in a descending order. In some embodiments, the multi-objective function R(X) is pre-defined by an administrator of the online booking system 111. In some embodiments, a listing is excluded from the serving vector X if the probability of serving the listing to the user is substantially zero.

The multi-objective function R(X) includes one or more objective functions $R_i(X)$. Each objective function $R_i(X)$ includes a coefficient (e.g., lambda $\lambda_i$) that governs a relative importance of each objective function $R_i(X)$. Each objective function $R_i(X)$ is configured to address a different goal in the overall optimization. In some embodiments, the multi-objective function $R(X) = \lambda_1 R_1(X) + \lambda_2 R_2(X) + \ldots + \lambda_m R_m(X)$, where lambda $\lambda_i$ governs the importance of $R_i(X)$, $i=1, 2, \ldots, m$ and $\Sigma_{i=1}^{m} \lambda_i = 1$. For example, in a two-objective multi-objective function R(X), first lambda $\lambda_1$ is greater than second lambda $\lambda_2$ if the importance of the first objective function $R_1(X)$ is greater than the importance of the second objective function $R_2(X)$. Further, if the first lambda $\lambda_1$ is, e.g., 0.4, then the second lambda $\lambda_2$ is 0.6 because $\Sigma_{i=1}^{2} \lambda_i = 1$. Similarly, the second lambda $\lambda_2$ is greater than the first lambda $\lambda_1$ if the importance of the second objective function $R_2(X)$ is greater than the importance of the first objective function $R_1(X)$. Lambda $\lambda_i$ may be pre-defined by an administrator of the online booking system 111. Alternatively, lambda $\lambda_i$ may be learned by separate algorithms.

In some embodiments, the one or more objective functions $R_i(X)$ includes a first objective function $R_1(X)$. The first objective function $R_1(X)$ represents a total expected number of bookings given the serving vector X. The first objective function $R_1(X)$, by definition, is computed as $R_1(X) = \Sigma_{i=1}^{n} x_i p_i$, where $p_i$ is the conditional probability of booking listing i given listing i is served, and $x_i$ is the probability of serving listing i. The product of $x_i$ and $p_i$ denotes expected booking from item i. Summing over i denotes total expected bookings from all items. A probability vector $P=[p_1, p_2, \ldots, p_n]$ may be learned by separate algorithms. The separate algorithms may include a standard machine learning algorithm (e.g., logistic regression, SVM, XGboost, neural network, etc.) or simple heuristics (e.g., booking rate calculated as number of bookings divided by total number of impressions for a particular item). In some other embodiments, the first probability of booking a listing and the second probability of serving the listing are in different objective functions.

Inventory Balancing

The inventory balancing module 213 is part of the ranking module 211 and computes the objective function for occupancy rate given the serving vector X In some embodiments, the one or more objective functions $R_i(X)$ include a second objective function $R_2(X)$. The second objective function $R_2(X)$ boosts rankings for listings with low occupancy rate while maintaining a controllable ranking regression for listings with high occupancy rate. Low occupancy rate may be any rate that fails to recoup the host's expenses for carrying out the experience, or any other minimum threshold level of booking that the host would consider as not being worthwhile to carry out the experience. High occupancy rate may be any rate that at least recoups the host's expenses for carrying out the experience.

As introduced above, in one embodiment the multi-objective function R(X) is the sum of the first objective function $R_1(X)$ and the second objective function $R_2(X)$. In some embodiments, the multi-objective function $R(X) = \lambda_1 R_1(X) + \lambda_2 R_2(X) = \Sigma_{i=1}^{n} x_i [(1-\lambda_i) p_i + \lambda_i f(occ_{rate_i})]$. In some embodiments, the second objective function $R_2(X)$ includes a function (e.g., $f(occ_{rate_i})$). The function can be an arbitrary function with respect to $occ_{rate}$, as long as it describes reasonable dependency between $occ_{rate}$ and the objective (e.g., reward function). The function may include a linear interpolant between a first epsilon value and a second epsilon value. The function is described below with reference to FIG. 3 in detail.

Figure 3:
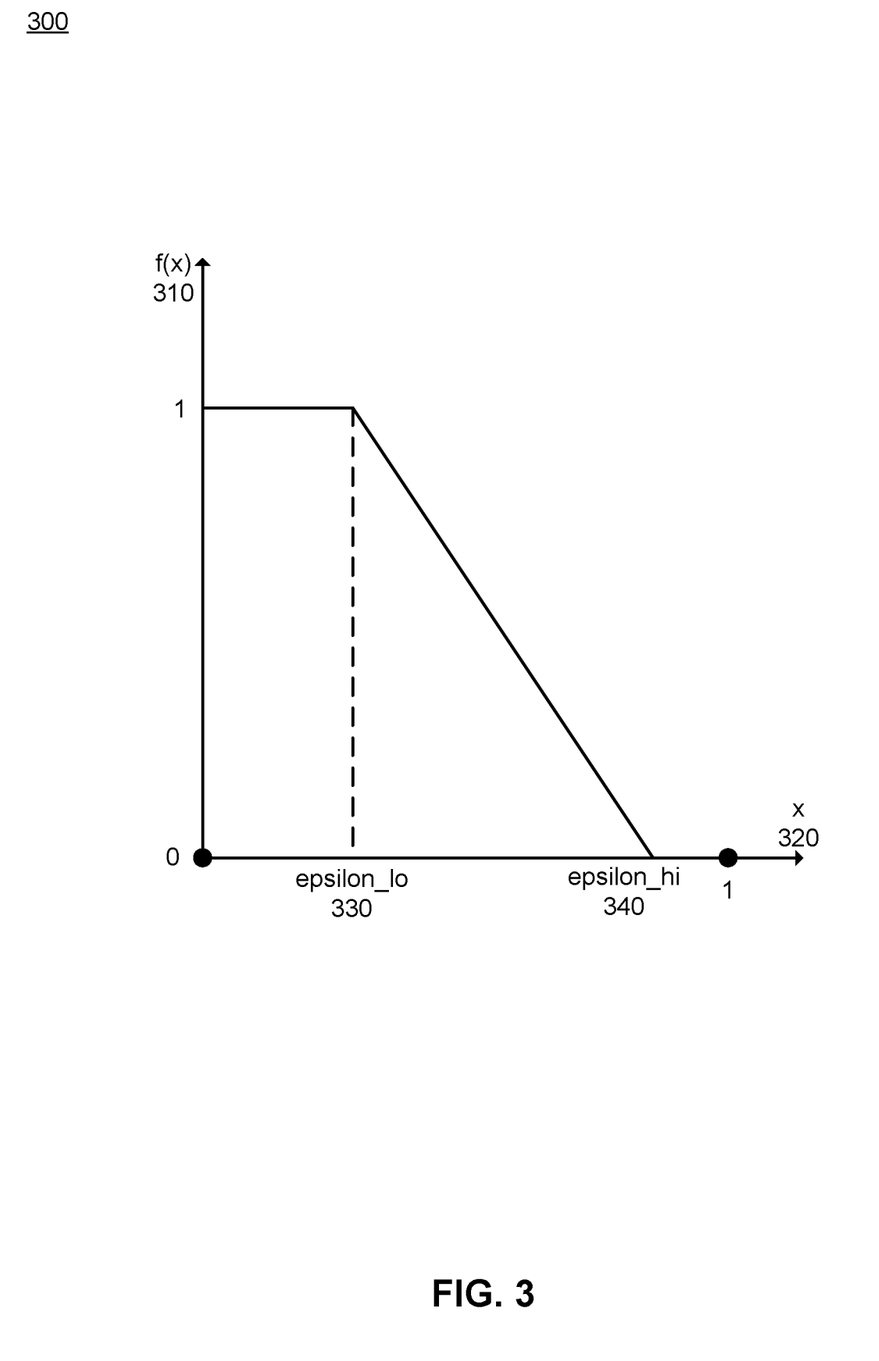
FIG. 3 is a function of an inventory balancing module, according to one embodiment.

FIG. 3 is a function 300 of the inventory balancing module, according to one embodiment. In the embodiment of FIG. 3, the function 300 is a reward function, but is not limited thereto. The function 300 may be, for example, log, square root, step function, or another similarly function. FIG. 3 plots an example function 300 f(x) on a y axis 310 relative to an example x axis 320. In this example, the x-axis 320 is occupancy rate and f(x) 310 is a function of occupancy rate. The f(x) 310 axis and the x 320 axis both range from zero to one. In some embodiments, x 320 is revenue and f(x) 310 is a function of revenue. In some other embodiments, x 320 is profit and f(x) 310 is a function of profit. Other functions for f(x) are also envisioned, depending on the objectives to be maximized with the set of objective functions R(X). The occupancy rate of a listing is provided as input to the function, and the function returns a value between 0 and 1. The value is applied to the total reward, as shown in the multi-objective function above (e.g., R(X) is equal to the sum of $R_1(X)$ and $R_2(X)$).

For many example functions, f(x) 310 is designed to be large when x 320 (e.g., occupancy rate, revenue, profit, etc.) is low and vice versa. At zero occupancy, F(0)=0 because if a listing has not been booked by anyone, the opportunity cost for the host is zero since the host can simply cancel the experience to recoup costs. Thus, there is no incentive to boost the listing. Similarly, if occupancy rate for a listing is high (e.g., x≥epsilon_hi 340), there is no incentive to boost the listing since the host is able to at least recoup costs by carrying out the experience. In one embodiment, to avoid a sudden jump in rankings for listings whose occupancy rate is close to epsilon_lo 330, the function 300 includes a linear interpolant (e.g., negative slope) from epsilon_lo 330 to epsilon_hi 340. In the embodiment of FIG. 3, the first epsilon value (e.g., epsilon_lo 330) is 0.5 and the second epsilon value (e.g., epsilon_hi 340) is 0.9, but is not limited thereto. The range of epsilon values may range from the first epsilon value to 1. However, the range of epsilon values is smaller in practice. For example, the first epsilon value may range from, e.g., 0.5 and the second epsilon value may range from, e.g., 0.6-0.9. In alternative embodiments, the first epsilon value (e.g., epsilon_lo 330) is 0.5 and the second epsilon value (e.g., epsilon_hi 340) is 0.6.

Diversity

Diversity is a metric for a set of items, not for a single item. Instead of incorporating a diversity metric directly in the process of optimizing the multi-objective function R(X), the diversity module 214 post-processes the serving vector X such that the set of listings of the serving vector X is in a ranked order according to a diversity measure. In some embodiments, the diversity module 214 post-processes the serving vector X after the complete ranked list $D=[D_1,$ $D_2, \ldots, D_M$] is returned based on the sorted serving vector X in descending order. The sorted serving vector X is denoted by X.

The diversity measure div($D_i, D_j$) measures content diversity (e.g., different categories like arts, concerts, sports, etc.) by performing a comparison between listings. For example, div(SportA,SportB) is small but div(SportA,ConcertB) is large. By factoring in content diversity, the user of the online booking system will not see results that exclusively come from one or two popular experience categories, but from diversified experience categories. In some other embodiments, the diversity measure div($D_i, D_j$) measures social diversity (e.g., host ethnicity, host gender, etc.). By factoring in social diversity, the user of the online booking system will not see results that disproportionately represent particular demographics, but instead will see experiences hosted by a range of different demographics. The diversity div($D_i, D_j$) may measure diversity with respect to any item of information associated with hosts or their associated listings.

Figure 4A:
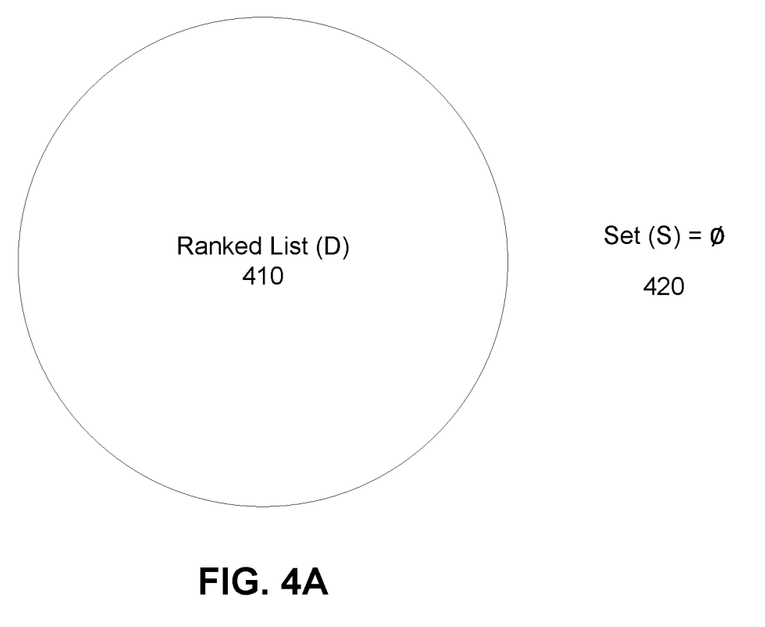
FIGS. 4A-4B are diagrams illustrating iteratively post processing a serving vector after a complete ranked list is returned based on the sorted serving vector, according to one embodiment.
Figure 4B:
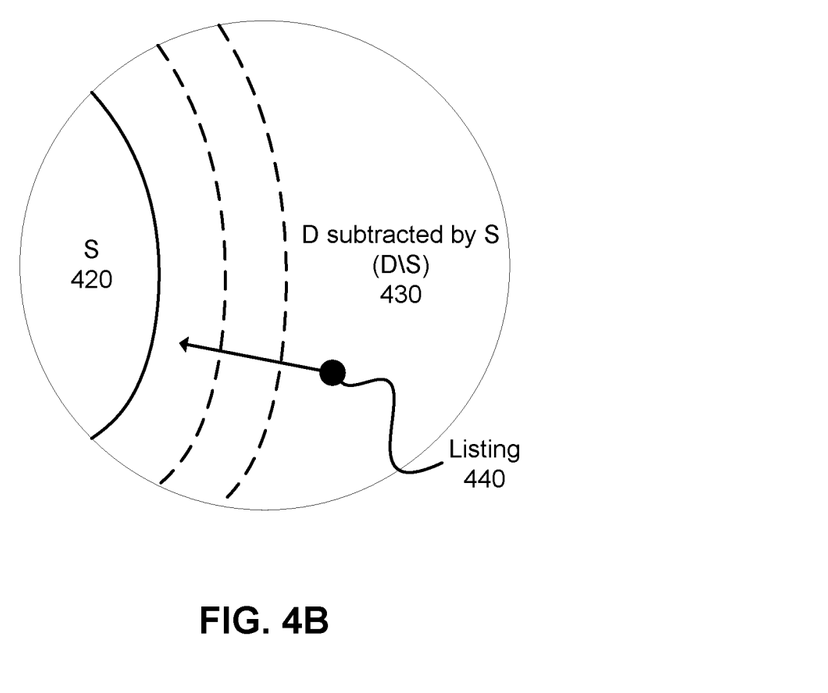

FIGS. 4A-4B are diagrams illustrating iteratively post processing a serving vector after a complete ranked list is returned based on the sorted serving vector, according to one embodiment.

FIG. 4A is a diagram illustrating the ranked list D 410 and a set S 420. The ranked list D includes all of the possible listings to be presented to the user. The set S 420 is initialized as the null set and stores reranked listings.

In FIG. 4B, the diversity module 214 picks a first listing 440 from the ranked list D. In some embodiments, the first listing 440 is the first listing $D_1$ of the ranked list D. In some other embodiments, the first listing 440 is another listing from the ranked list D. Then, the first listing 440 is appended to the set S 420. As a result, the ranked list D is now the ranked list D 410 subtracted by the set S 420, or D\S 430. The diversity module 214 picks a second listing from D\S 430 by maximizing serving probability and a worst-case diversity measure between the listing to be selected and the listings already selected in the set S. More specifically, the following quantity is maximized:

$$i^* = \text{argmax}_{D_i \in D \setminus S}[(1-\alpha)^* X'_i + \alpha^* \min_{D_j \in S} \text{div}(D_i, D_j)],$$
$$0 < \alpha < 1$$

$\alpha$ is a tuning parameter that strikes a balance between $X'_i$, the probability of serving listing i of the sorted serving vector X', and $\min_{D_j \in S} \text{div}(D_i, D_j)$, the worst-case diversity measure between $D_i$, the second item to be selected, and items already in the set S 420. After i* is found, the second item $D_i$ is appended to the set S 420. The above steps are repeated until the set S 420 stores all of the reranked listings, and D\S 430 is the null set.

As an example, the post-processing performed by the diversity module 214 may be carried out as further described below in pseudo code.

```
S = Ø, D = [D_1, D_2, ..., D_M]
S = Append(D_1)
for(i = 2, i ≤ M, i + +)
    i* = argmax_{D_i∈D\S} [(1 - α) * X'_i + α * min_{D_j∈S}div(D_i, D_j)]
    S = Append(D_i*)
return S
```

The diversity module 214 returns the set S 420. The set S 420 is a reranking of the sorted serving vector X' considering the mutual diversity of listings. The ordering of the original sorted serving vector X' will be approximately maintained if $\alpha$ is small (e.g., $\alpha$=0.5). $\alpha$ depends on a relative scale between $X'_i$ and $\min_{D_j \in S} \text{div}(D_i, D_j)$. $\alpha$ may be pre-defined by an administrator of the online booking system. Alternatively, a may be learned by separate algorithms.

Exemplary Method

Figure 5:
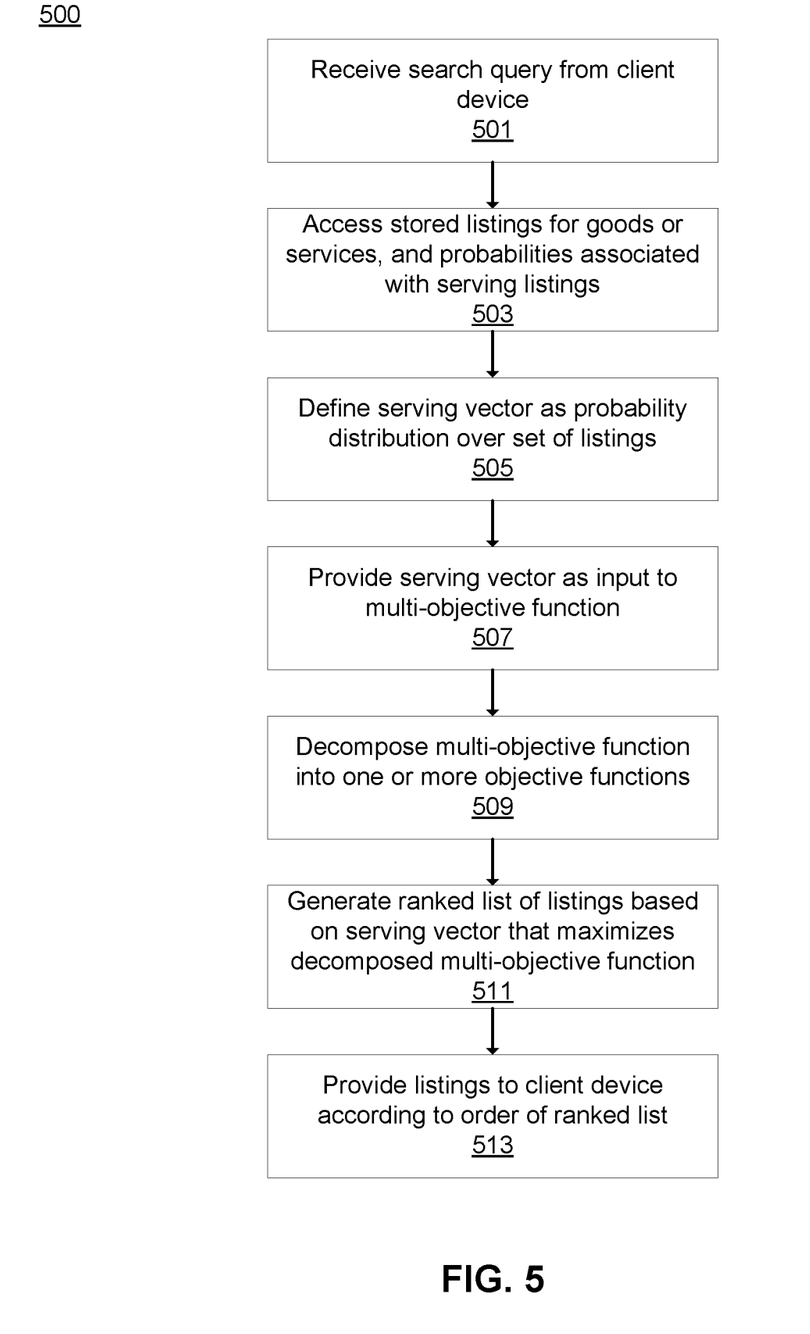
FIG. 5 is a flow chart for ranking listings of goods or services using a recommendation ranking algorithm that optimizes beyond booking, according to one embodiment.

FIG. 5 is a flow chart for ranking listings of goods or services using a recommendation ranking algorithm that optimizes beyond booking, according to one embodiment. In step 501, the online booking system 111 receives a search query from a client device. In step 503, the online booking system 111 accesses a set of stored listings for goods or services, and probabilities associated with serving the listings. In some embodiments, the probabilities are learned by separate algorithms. In step 505, the online booking system 111 defines a serving vector as a probability distribution over the set of listings. The serving vector maximizes a multi-objective function. In step 507, the online booking system 111 provides the serving vector as input to the multi-objective function. In step 509, the online booking system 111 decomposes the multi-objective function into one or more objective functions. Each objective function addresses a different goal in an overall diversity optimization. In step 511, the online booking system 111 generates a ranked list of the listings based at least in part on the decomposed multi-objective function. In step 513, the online booking system 111 provides the listings to the client device according to the order of the ranked list.

Online Experiment

An online experiment was conducted to test the recommendation ranking algorithm of the present disclosure. More specifically, parameters such as lambda, epsilon_lo, and epsilon_hi of the second objective function were tuned, and changes in experience occupancy rates were measured. The metrics evaluated include bookings of low occupancy experiences in the next ten days, bookers of low occupancy experiences in the next ten days, bookings of empty/high occupancy experiences in the next ten days, and bookers of empty/high occupancy experiences in the next ten days. The online experiment was conducted in two separate phases: a conservative phase and an aggressive phase.

In the conservative phase, lambda was 0.2, epsilon_lo was 0.5, and epsilon_hi was set to 0.9. In the aggressive phase, lambda was 0.4, epsilon_lo was 0.5, and epsilon_hi was 0.6.

In the results of the experiment, the metrics were neutral for the conservative phase. The changes in bookings of low occupancy experiences and empty/high occupancy experiences were negligible. The lambda value (e.g., 0.2) was too small and the range of epsilon values (e.g., 0.5-0.9) was too large to change the ranking of the listings significantly.

In contrast, the metrics experienced noticeable change for the aggressive phase. The bookings of low occupancy experiences increased by 12 percent, and the bookers of low occupancy experiences increased by 8.6 percent. The bookings and bookers of high occupancy experiences both decreased by 12 percent. The bookings of empty experiences decreased by 13 percent, and the bookers of empty experiences decreased by 12 percent. For experiences that occurred between Feb. 15, 2018 and Apr. 1, 2018, 521 experiences had greater than three instances in pre-experiment (Feb. 15, 2018-Feb. 28, 2018) and greater than three instances in post-experiment (Mar. 15, 2018-Mar. 31, 2018). The average occupancy rate was 54.7 percent pre-experiment and 57.1 percent post-experiment. There was a 12.5 percent experiences shift from low-occupancy experiences (e.g., average occupancy rate less than 50 percent) to high-occupancy experiences (e.g., average occupancy rate greater than 50 percent). For 30 percent of experiences, the average occupancy rate increased by greater than 10 percent. Additionally, bookings of social impact experiences increased by 20 percent.

So, due to the second objective function including the concave function of occupancy rate, low occupancy experiences below epsilon_lo (e.g., 0.5) were boosted, high occupancy experiences above epsilon_hi (e.g., 0.6) were decreased, and empty experiences were decreased. As a result, the bookings and occupancy rates of low-occupancy experiences were boosted and the overall occupancy rate was increased. Thus, the method of the inventory balancing module as described herein is effective achieving the goal set forth: boosting or redirecting experience bookings to achieve inventory balancing. Although in this experiment occupancy rate metric was chosen to be boosted, in practice these techniques are equally applicable to optimize for other secondary metrics such as host revenue, cost minimization, etc.

What is claimed is:

1. A computer implemented method for incorporating multiple objectives in a ranked list of search results provided for display as part of a graphical user interface on a display screen of a computing device, the method comprising:
receiving a search query from a client device;
accessing a set of stored listings for goods or services, and probabilities associated with serving the listings;
defining a serving vector as a probability distribution over the set of listings;
providing the serving vector as input to a multi-objective function;
decomposing the multi-objective function into one or more objective functions, each objective function configured to address a different goal in an overall diversity optimization;
generating a first ranked list of the listings based at least in part on the serving vector that maximizes the decomposed multi-objective function, wherein the serving vector is sorted by probability in a descending order;
iteratively post-processing the serving vector after the first ranked list is returned based on the sorted serving vector, the iterative post-processing comprising:
picking a first listing from the first ranked list;
initializing a set as the null set;
appending the first listing of the first ranked list to the set where reranked items are stored;
picking a second listing out of the first ranked list subtracted by the set by maximizing serving probability and a worst-case diversity measure between the listing to be selected and listings already selected in the set; and
appending the second item to the set and repeating the above steps of the iterative post-processing; and
generating a second ranked list based on the first ranked list and the iteratively post-processed serving vector;
providing the listings for display on the client device according to the order of the second ranked list.

2. The computer implemented method of claim 1, wherein each of the objective functions comprises a coefficient that governs a relative importance of each objective function in the overall diversity optimization.

3. The computer implemented method of claim 1, wherein the one or more objective functions include a first objective function that represents a total expected number of bookings given the serving vector.

4. The computer implemented method of claim 3, wherein the first objective function comprises a first probability of booking of a serving item and a second probability of serving the listing.

5. The computer implemented method of claim 1, wherein the one or more objective functions includes a second objective function that boosts rankings for the listings of the set with low occupancy rate while maintaining a controllable ranking regression for listings of the set with high occupancy rate.

6. The computer implemented method of claim 5, wherein the second objective function is summed with the first objective function.

7. The computer implemented method of claim 6, wherein the concave function is a function of occupancy rate, the concave function being configured to be large when occupancy rate for a listing is low and small when occupancy rate for a listing is high.

8. The computer implemented method of claim 6, wherein the concave function is a function of at least one of revenue, profit, and cost.

9. The computer implemented method of claim 5, wherein the second objective function comprises a concave function.

10. The computer implemented method of claim 9, wherein the concave function includes a linear interpolant between a first epsilon value and a second epsilon value.

11. The computer implemented method of claim 1, wherein the worst-case diversity measure measures at least one of content diversity and social diversity by performing a comparison between listings.

12. A non-transitory computer-readable medium comprising memory with instructions encoded thereon for incorporating multiple objectives in a ranked list of search results provided for display as part of a graphical user interface on a display screen of a computing device, the instructions, when executed by one or more processors, causing the one or more processors to perform operations, the instructions comprising instructions to:
receive a search query from a client device;
access a set of stored listings for goods or services, and probabilities associated with serving the listings;
define a serving vector as a probability distribution over the set of listings;
provide the serving vector as input to a multi-objective function;
decompose the multi-objective function into one or more objective functions, each objective function configured to address a different goal in an overall diversity optimization;
generate a first ranked list of the listings based at least in part on the serving vector that maximizes the decomposed multi-objective function, wherein the serving vector is sorted by probability in a descending order;
iteratively post-process the serving vector after the first ranked list is returned based on the sorted serving vector, the iterative post-processing comprising:
picking a first listing from the first ranked list;
initializing a set as the null set;
appending the first listing of the first ranked list to the set where reranked items are stored;
picking a second listing out of the first ranked list subtracted by the set by maximizing serving probability and a worst-case diversity measure between the listing to be selected and listings already selected in the set; and
appending the second item to the set and repeating the above steps of the iterative post-processing; and generate a second ranked list based on the first ranked list and the iteratively post-processed serving vector; and provide the listings for display on the client device according to the order of the second ranked list.

13. The non-transitory computer-readable medium of claim 12, wherein each of the objective functions comprises a coefficient that governs a relative importance of each objective function in the overall diversity optimization.

14. The non-transitory computer-readable medium of claim 12, wherein the one or more objective functions include a first objective function that represents a total expected number of bookings given the serving vector.

15. The non-transitory computer-readable medium of claim 14, wherein the first objective function comprises a first probability of booking of a serving item and a second probability of serving the listing.

16. The non-transitory computer-readable medium of claim 12, wherein the one or more objective functions includes a second objective function that boosts rankings for the listings of the set with low occupancy rate while maintaining a controllable ranking regression for listings of the set with high occupancy rate.

17. The non-transitory computer-readable medium of claim 12, wherein the worst-case diversity measure measures at least one of content diversity and social diversity by performing a comparison between listings.

* * * * *